(12) United States Patent
Shindin et al.

(10) Patent No.: US 12,299,578 B2
(45) Date of Patent: May 13, 2025

(54) METHOD AND SYSTEM FOR UNSTRUCTURED INFORMATION ANALYSIS USING A PIPELINE OF ML ALGORITHMS

(71) Applicant: International Business Machines Corporation, Armonk, NY (US)

(72) Inventors: Evgeny Shindin, Nesher (IL); Eliezer Segev Wasserkrug, Haifa (IL); Yishai Abraham Feldman, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 1097 days.

(21) Appl. No.: 17/131,818

(22) Filed: Dec. 23, 2020

(65) Prior Publication Data

US 2022/0198274 A1    Jun. 23, 2022

(51) Int. Cl.
G06N 3/08      (2023.01)
G06F 16/334    (2025.01)
G06N 3/047     (2023.01)
G06N 3/084     (2023.01)

(52) U.S. Cl.
CPC ......... G06N 3/084 (2013.01); G06F 16/3346 (2019.01); G06N 3/047 (2023.01)

(58) Field of Classification Search
None
See application file for complete search history.

(56) References Cited

U.S. PATENT DOCUMENTS

2016/0224803 A1    8/2016  Frank

FOREIGN PATENT DOCUMENTS

WO    WO-2014018687 A1 *    1/2014    ......... G06F 17/2785

OTHER PUBLICATIONS

Dey et al. "Predictive Analytics with Structured and Unstructured data—A Deep Learning based Approach," IEEE Intelligent Informatics Bulletin, 18 (2): 27-34, Dec. 2017.
Kuflinski. "Extracting Meaning: The Convergence of Machine Learning and Text Analysis," retrieved from the Internet, published Oct. 22, 2018, 14 pages.
Rajput et al. "Use of Bayesian Network in Information Extraction from Unstructured Data Sources," World Academy of Science, Engineering and Technology 52: 325-331, 2009.
Smolyakov. "Ensemble Learning to Improve Machine Learning Results" retrieved from the Internet, published Aug. 22, 2017, 10 pages.

(Continued)

*Primary Examiner* — Alan Chen
(74) *Attorney, Agent, or Firm* — Lily Neff

(57) ABSTRACT

A system and a method for increasing the classification confidence, with lesser dependence on large sets of training data, obtained by one or more machine learning based algorithms, by analyzing unstructured information using unstructured analysis pipeline comprising a probabilistic network such as a Bayesian network. The probabilistic network may comprise nodes associated with elements and cues defined by experts, and require fewer labelled data samples to train. The confidence level of the elements may be determined by machine learning and unstructured analysis methods and processed by the probabilistic network to estimate the confidence for a characterization quantity.

17 Claims, 6 Drawing Sheets

(56) References Cited

OTHER PUBLICATIONS

Liang, et al., Bayesian Framework for Multidisciplinary Uncertainty Quantification and Optimization, 16th AIAA Non-Deterministic Approaches, Jan. 13, 2014, 14 pages.
Abdulhafiz, et al., Handling Data Uncertainty and Inconsistency Using Multisensor Data Fusion, Research Article, Nov. 3, 2013, 11 pages.
Chatfield, Chris, Model Uncertainty, Data Mining and Statistical Inference, Journal of the Royal Statistical Society. Series A, Statistics in Society, May 1995, vol. 158, No. 3, pp. 419-466.
Contreras, et al., Bayesian Data Analysis To Quantify The Uncertainty Of Intact Rock Strength, Journal of Rock Mechanics and Geotechnical Engineering, Feb. 2018, vol. 10, Issue 1, pp. 11-31.
Eriksson, et al., Uncertainty Quantification, Propagation And Characterization By Bayesian Analysis Combined With Global Sensitivity Analysis Applied To Dynamical Intracellular Pathway Models, Bioinformatics, vol. 35, Issue 2, Jul. 13, 2018, pp. 284-292.
Harir, et al., Uncertainty in big data analytics: survey, opportunities, and challenges, Journal of Big Data, Jun. 4, 2019 Volume 6, Article No. 44, 16 pages.
Liang, et al., Bayesian Sensitivity Analysis and Uncertainty Integration for Robust Optimization, Journal of Aerospace Computing, Information and Communication, Nov. 2014, pp. 189-203.
Lopez, et al., A General Bayesian Treatment For Meg Source Reconstruction Incorporating Lead Field Uncertainty, Neuroimage, Apr. 02, vol. 60, Issue 2, pp. 1194-1204.
Spiegelhalter, et al., Bayesian approaches to multiple sources of evidence and uncertainty in complex cost-effectiveness modelling, Statistics in Medicine, Nov. 14, 2003, vol. 22, Issue 23, 23 pages.
Vine N. Le., Combining Information From Multiple Flood Projections In A Hierarchical Bayesian Framework, Water Resources Research, Mar. 18, 2016, pp. 3258-3275.
Wilson, et al., Bayesian reliability: Combining information, Quality Engineering, Aug. 26, 2016, vol. 29 Issue. 1, pp. 119-129.
Winkler, L., Combining Probability Distributions from Dependent Information Sources, Management Science, Apr. 1, 1981, vol. 27, No. 4, pp. 479-488.
Zhang, et al., Improving Optical Measurement Uncertainty With Combined Multitool Metrology Using A Bayesian Approach, Applied Optics, 2012 vol. 51, Issue 25, pp. 6196-6206.

* cited by examiner $$P_{l_i}(\text{Characterization quantity } x) =$$
$$\sum_{\forall j \in J} P(QOI\ x | Element\ x_{n,m} = k_{j,n,m} \forall n, m) \prod_{\forall n,m} F_j(p_{n,m})$$

$$J = \left\{ \forall j = 0, \ldots, 2^{\sum_{n=1}^{N} M_n} - 1 \right\}$$

$$k_{j,n,m} = Bin(j)[(n-1)M_n + m]$$

$$F_j(p_{n,m}) = \begin{cases} p_{n,m} & k_{j,n,m} = 1 \\ 1 - p_{n,m} & k_{j,n,m} = 0 \end{cases}$$

METHOD AND SYSTEM FOR UNSTRUCTURED INFORMATION ANALYSIS USING A PIPELINE OF ML ALGORITHMS

FIELD AND BACKGROUND OF THE INVENTION

The present invention, in some embodiments thereof, relates to inference from unstructured data using a statistical machine learning model, and, more particularly, but not exclusively, using interim representations of cues to estimate a characterization quantity.

Machine learning (ML) tasks may comprise estimating the probability of one or more binary or categorical variables that may represent complex structures, events, symptoms, and/or the like. Many different ML algorithms which enable achieving this goal are based on a set of training examples having some structure that is related to the target complex variable. Examples of these supervised training based algorithms comprise natural language processing algorithms such as sentiment analysis and topic identification, converting voice to text or musical notes, computer vision tasks such as object classification, object detection, event extraction, and the likes. These algorithms assume that the training examples provided are substantially correctly labelled, and have a consistent structure. However, some problems require inference from unstructured description of the case, or samples of different aspects of the instance to classify. Unstructured descriptions may comprise text, audio, images, video, or other information with internal structure that is not consistent between samples, or not related to the variables to infer or estimate.

For example, in diagnosis, medical, mechanical, and the like, information about existence or non-existence of some symptoms may be present as an image, a verbal sample, a typed text or a handwritten text and/or the like. However, ML algorithms may split the text to some logical parts, (e.g. sentences) and predict specific indications, relations and/or the likes that may be mentioned in each logical part with different confidences. However, predicting specific symptoms using these indications may be difficult. For example, detecting a specific problem at a specific system component using ML algorithms require that:

a) The specific component is mentioned in the text.
b) The specific problem is mentioned in the text.
c) The specific problem mentioned in the text relates to the specific component of the system, and not to other components that may also be mentioned in the text.

SUMMARY OF THE INVENTION

Shortcomings of this known practice include relying on black box training, and uniformity in sample structure. Complex inferences may require considering the certain levels of inference components, and probabilities of alternative possibilities. Moreover, supervised training based algorithms require a set of labeled samples, i.e. images, voice samples, text samples and/or the like, inspected by humans and manually labeled by them. It is clear that obtaining samples requires an effort, proportional to number of samples, and hence number of samples is limited. In order to compensate for small training set one can apply several prediction algorithms to obtain good text recognition, that introduce additional complexity, because combination of results of such algorithms is not obvious.

It is an object of the present disclosure to provide a system and a method for inferring a characterization quantity from unstructured information, using unstructured analysis pipeline connected to a probabilistic network, using knowledge based or inferred elements.

The foregoing and other objects are achieved by the features of the independent claims. Further implementation forms are apparent from the dependent claims, the description and the figures.

According to a first aspect of some embodiments of the present invention there is provided a system for inferring a probability of presence of a characterization quantity in unstructured data, the system comprising:

a processor adapted to execute a code for:
  receiving an unstructured data sample;
  extracting at least one sample slice from the unstructured data sample;
  inferring a plurality of confidence values, each assigned to an element representing an interim factor indicated to be informative about at least one cue, by applying at least one machine learning model on the at least one sample slice;
  feeding the plurality of confidence values into a probabilistic network having a plurality of nodes wherein each of the plurality of nodes represents an element;
  calculating a plurality of additional confidence values, each assigned to a cue, indicated to be informative about the probability of presence of a characterization quantity interest, by processing the plurality of confidence values using an associated layer of the probabilistic network; and
  inferring the probability of presence for the characterization quantity, by processing the plurality of additional confidence values using another associated layer of the probabilistic network.

According to a second aspect of some embodiments of the present invention there is provided a method for training the system of the first aspect, or a system for inferring a probability of presence of a characterization quantity in unstructured data, comprising:

receiving an unstructured data sample;
when the unstructured data sample was received without an associated label, generate the associated label using an unstructured analysis algorithm;
extracting at least one sample slice from the unstructured data sample;
inferring a plurality of confidence values, each assigned to an element representing an interim factor indicated to be informative about at least one cue, by applying at least one machine learning model on the at least one sample slice;
feeding the plurality of confidence values into a probabilistic network having a plurality of nodes wherein each of the plurality of nodes represents an element;
calculating a plurality of additional confidence values, each assigned to a cue, indicated to be informative about the probability of presence of a characterization quantity, by processing the plurality of confidence values using an associated layer of the probabilistic network;
inferring the probability of presence for the characterization quantity, by processing the plurality of additional confidence values using another associated layer of the probabilistic network;
updating parameters of the probabilistic network representing the indicated prior of the co-occurrence characteristics, so that the probability of presence for the characterization quantity inferred is increased when the characterization quantity complies with the associated label; and updating parameters of the probabilistic network representing the indicated prior of the co-occurrence characteristics, so that the probability of presence for the characterization quantity inferred is decreased when the characterization quantity does not comply with the associated label.

According to a third aspect of some embodiments of the present invention there is provided a computer implemented method of inferring a characterization quantity from unstructured data, using a probabilistic network and a plurality of machine learning models, the computer implemented method comprising:

receiving at least one characterization quantity, a plurality of cues associated with the at least one characterization quantity, and each cue of the plurality of cues having a plurality of elements associated therewith;

receiving at least one sample of unstructured data;

extracting at least one sample slice from the sample of unstructured data;

generating a plurality of confidence measures for a plurality of elements by processing the at least one sample slice using at least one of the plurality of machine learning models;

generating an additional plurality of confidence measures for a plurality of cues based on confidence measures of the plurality of elements using the probabilistic network; and generating a confidence measure for the at least one characterization quantity, based on confidence measures of at least one of the plurality of cues using the probabilistic network.

According to a fourth aspect of some embodiments of the present invention there is provided computer program product for inferring a characterization quantity from unstructured data, using a probabilistic network and a plurality of machine learning models, the computer program product comprising a non-transitory computer readable storage medium having:

first program instructions for receiving at least one characterization quantity, a plurality of cues associated with the at least one characterization quantity, and each cue of the plurality of cues having a plurality of elements associated therewith;

second program instructions for receiving at least one sample of unstructured data;

third program instructions for extracting at least one sample slice from the sample of unstructured data;

fourth program instructions for generating a plurality of confidence measures for a plurality of elements by processing the at least one sample slice using at least one of the plurality of machine learning models;

fifth program instructions for generating an additional plurality of confidence measures for a plurality of cues based on confidence measures of the plurality of elements using the probabilistic network; and sixth program instructions for generating a confidence measure for the at least one characterization quantity, based on confidence measures of at least one of the plurality of cues using the probabilistic network.

Optionally, the probabilistic network is a Bayesian network wherein the node associated with the at least one characterization quantity is connected to a plurality of nodes, each associated with a cue from a plurality of cues, through edges representing the relations between the values and probabilities.

Optionally, the plurality of nodes associated with a cue, are connected to additional pluralities of nodes, each node from the additional pluralities of nodes associated with an element, through edges representing the relations between the values and probabilities.

Optionally, the confidence measure for the at least one characterization quantity is a non-decreasing function of the plurality of additional of confidence measures associated with cues associated with the at least one characterization quantity.

Optionally, a cue confidence measure from the additional plurality of confidence measures is a non-decreasing function of the plurality of confidence measures for the plurality of elements associated with the cue.

Optionally, extracting the at least one sample slice comprises applying separators intrinsic to the unstructured data.

Optionally, further comprising using a plurality of sample slices extracted from additional samples of unstructured data.

Optionally, further comprising assigning labels to the plurality of sample

Optionally, further comprising using models from the at least one machine learning model on the labelled sample slices and estimating a plurality of back-propagated element confidence values from associated cues, associated with the at least one characterization quantity.

Optionally, further comprising estimating the confidence measure for the at least one characterization quantity using the probabilistic network, and the plurality of back-propagated element confidence values.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings and formulae. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
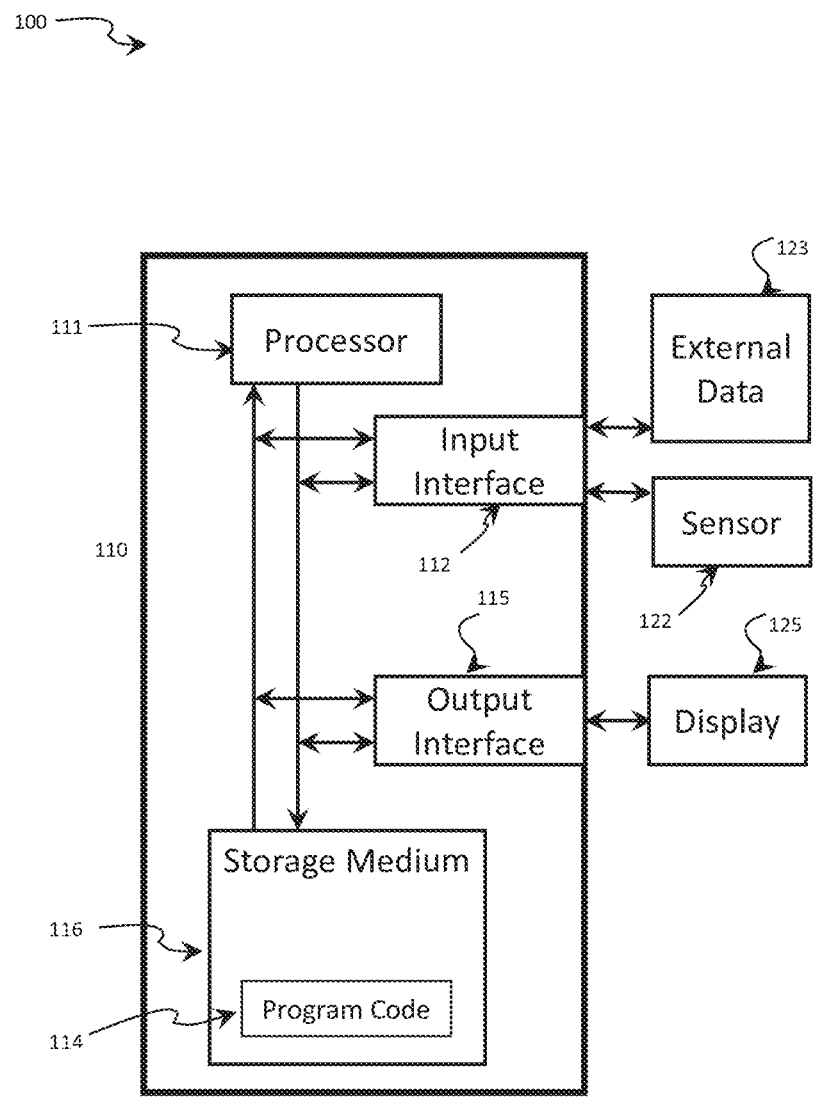
FIG. 1 is a schematic illustration of an exemplary system for unstructured information analysis using a pipeline of machine learning algorithms, according to some embodiments of the present disclosure.

The present invention, in some embodiments thereof, relates to inference from unstructured data using a statistical machine learning model, and, more particularly, but not exclusively, using interim representations of patterns to estimate a characterization quantity.

Some embodiments of the present invention combine the classification confidence, obtained by different ML algorithms, by analyzing unstructured information using unstructured analysis pipeline comprising a probabilistic network such as a Bayesian network (BN). The method may require a smaller number of labeled samples, compared to traditional supervised learning, and predict probabilities of node occurrence in the BN.

A binary or another variable of interest, which may be inferred from unstructured information, may be referred to as a characterization quantity, or a variable or a quantity of interest (QOI). When a variable of interest is not binary but has a finite number of possible values, it may be decomposed to a set of binary variables, for example by one hot.

A value, indication, property, and/or the like, that may contribute to the determination of one or more characterization quantities and can be learned by an ML algorithm, may be referred to as an element.

An ordered set of elements that may suffice to determine one or more characterization quantities according to an expert opinion may be referred to as a cue or a pattern. One or more experts may define cues. Cues may be based on patterns of a predefined number of elements.

A part of unstructured information, that is naturally separated from other parts and may be informative on one or more specific characterization quantities, may be referred to as a logical block, a sample slice or a slice. Sample slices may be independent with respect to inferring variable values. Moreover, the method may not assume a specified order, or a label associated with the sample slices. For example, a text may contain several sentences, wherein each sentence may comprise information about some specific problem with some specific component.

For example, a customer may report a problem in the washer. In that case, a characterization quantity may be a specific failure, such as a leakage, an element may be words such as water and bottom, and a cue may be both bottom and water, related to each other, in the same sentence. Alternatively or additionally, the customer may submit an image of the washer, and the corresponding elements may be visual such as a puddle of water, and a cue may be a puddle of water at a specific location under the washer.

Furthermore, customers may report a car problem and submit a video showing the motor stopping due to a failure they have to diagnose, in addition or as an alternative to a vocal comment, a textual description, and/or the likes.

For another example, a customer may query the reputation of a brand, and collect instances of web pages, blog posts, comments, reviews, and/or the likes where the brand is mentioned. The elements in this examples may comprise words indicating positive or negative judgement such as impressive or horrible, and cues may be relations between such words and the brands which may be indicated by a sentiment analysis expert.

The method may be applied to estimate one or more values of complex binary or categorical variables, or the probability that these variables have specific sets of values, when known methods to estimate these value or probabilities are insufficient, however, there are one or more predictive cues, based on patterns of element that can be estimated from unstructured information (e.g. free text, speech, images, video).

Some embodiments of the present invention involve a set of cues, or patterns defined by experts. These embodiments may apply existing ML algorithms suitable for estimation of probabilities of elements presence in the unstructured data, and the cues may be based on patterns of the elements appearance. The proposed method allows generating Bayesian networks that are used to estimate probability of occurrence of binary variables representing set of values of original non-binary variable using unstructured information and a small quantity of labeled samples.

Some embodiments of the present invention are based on domain experts' definition of characterization quantities, and the unstructured information that can help to determine them. Followingly, ML experts together with domain experts define elements, and patterns of elements, which may be referred to as cues. Additionally, ML experts may define sample slices, and domain experts may label some parts of the unstructured data providing indication if one or more specific elements occur in a sample slice, if one or more specific cues or patterns occur in a sample slice, and values of characterization quantities given the sample slice.

Some embodiments of the present invention first check if a specific element occurs in a sample slice, and then if a specific cue occurs in the sample slice. Later the BN may determine the value of characterization quantity related to the sample slice. One or more ML expert may define set of ML algorithms to predict the probabilities of the elements.

An embodiment may comprise determining a set, X of characterization quantities, x, in the variable space $x \in X \subseteq V$. The algorithm may further comprise determining a training set including unstructured information containing $i=1, \ldots, I$ samples, which may be referred to as Set1, and an additional set, namely Set2, that includes unstructured information, divided to sample slices $l_i=1, \ldots, L_i$, $i \in I$ maintaining relation of each of the sample slices to the associated sample in the set Set1.

The algorithm may also comprise determining a set of cues for each characterization quantity, denoted $N_x=\{$Cue $x_1, \ldots,$ Cue $x_N\}$, and a set of elements for each cue $M_n=\{$Element Element $x_{n,1}, \ldots,$ Element $x_{n,MN}\}$.

The algorithm may also comprise determining a set of ML algorithms for predicting elements, form which cues may be identified from the unstructured information. The algorithm may also comprise determining a set of labeled samples, i.e. human interpretation of occurrence or non-occurrence of cue elements in each sample slice as well as human interpretation when the sample slice indicates occurrence or non-occurrence of one or more characterization quantities, which may be referred to as Set3.

The algorithm may generate a set of BNs, which may predict probabilities of Characterization quantities based on the unstructured analysis performed by the algorithms from the ML set, and the probabilities of the characterization quantities for the samples in Set1. Each BN from the set may comprise a leaf node for each associated element, connected to a node of the associated cue, and each characterization quantity connected to the associated cues. The BN may be trained using data from Set3. The algorithm may further comprise using algorithms from the ML set and labeled data from Set3 predict probabilities of each element from each cue for each characterization quantity, i.e. $p_{n,m}=P($Element $x_{n,m})\forall n=1, \ldots, N; m=1, \ldots, M_n$ The algorithm may further comprise estimating the probabilities of each characterization quantity using the BN from before and the BN after the training using data from Set3. The algorithm may conclude by choosing the characterization quantity, or a number of characterization quantities, having the maximal probability.

Before explaining at least one embodiment of the invention in detail, it is to be understood that the invention is not necessarily limited in its application to the details of instructions and the arrangement of the components and/or methods set forth in the following description and/or illustrated in the drawings and/or the Examples. The invention is capable of other embodiments or of being practiced or carried out in various ways.

Referring now to the drawings, FIG. 1 is a schematic illustration of an exemplary system for unstructured information analysis using a pipeline of machine learning algorithms, according to some embodiments of the present disclosure. An exemplary inference system 100 may execute processes, such as processes 200 and/or 300, which are described in FIG. 2 and FIG. 3 respectively, and may be applied for using the system or the device for unstructured information analysis, and/or training a system for unstructured information analysis using a pipeline of machine learning algorithms, respectively. The system may be used, for example, to answer one or more queries submitted by a user.

The inference system 100 may include an input interface 112, an output interface 115, a processor 111, and a storage medium 116 for storing a program code 114 and/or data. The processor 111 may execute program code 114 for implementing process 200 and/or process 300, which are described in FIG. 2 and FIG. 3 respectively. The inference system 100 may be implemented on one or more computers, compute server, and or the likes, physically located on a site, and/or implemented, as a distributed system, virtually on a cloud service, on machines also used for other functions, and/or the like.

Alternatively, the system 100 may be implemented on a mobile device, a programmable cellular phone, a tablet, and/or the likes.

Further alternatively, the system may comprise dedicated hardware, ASIC, FPGA, and/or the likes. It should be noted that application-specific hardware may account for better speed and lower power consumption, however, at a potential cost of additional resources required during design and limit flexibility in system updates. Hardware with strong parallel processing capabilities, such as one or more single instruction multiple data (SIMD) processors, digital signal processing (DSP) hardware, graphics processing unit (GPU), tensor processing unit (TPU), and/or the likes may be used to improve speed and accuracy, as training and inferring using neural networks and similar machine learning models may benefit from these capabilities.

The input interface 112 and the output interface 115 may comprise one or more wired and/or wireless network interfaces for connecting to one or more networks, for example, a local area network (LAN), a wide area network (WAN), a metropolitan area network, a cellular network, the internet and/or the like. The input interface 112 and the output interface 115 may further include one or more wired and/or wireless interconnection interfaces, for example, a universal serial bus (USB) interface, a wireless local area network (WLAN), and/or the like. Furthermore, the output interface 115 may include one or more wireless interfaces for loudspeakers, display, updating of external systems such as analytics, recommender systems, and/or the like, as well as other processors executing post-processing. The input interface 112 may include one or more wireless interfaces for receiving information from one or more devices. Additionally, the input interface 112 may include specific means for communication with one or more sensor devices 122 such as a camera, microphone, keyboard, touchscreen, mouse, scanner and/or the like. The input interface may be configured to access external data 123, such as datasets, forums, digital journals, review portals, e-commerce websites, dynamically updated analytics, and/or the likes, which are stored outside the system. Similarly, the output interface 115 may include specific means for communication with one or more display devices 125 such as a loudspeaker, screen, projector and/or the like. Furthermore, the display device may comprise a model, device, and/or the likes, which executes further processing on the ranking generated by the system. The output may be further used to update websites, analytics, databases, and/or the likes, which may be stored on other systems, the cloud, displayed on a web page through the internet, and/or the likes.

Unstructured data entities, their labels, properties, and/or embeddings thereof may be received through the input interface 112, from the storage medium 116, and/or the likes. It should be emphasized that it also comprises batches of tabular entities descriptions, properties, and/or embeddings thereof, as introduced to machine learning models in some applications.

The processor 111 may be homogenous or heterogeneous and may include one or more processing nodes arranged for parallel processing, as clusters and/or as one or more multi-core processors. The storage medium 116 may include one or more non-transitory persistent storage devices, for example, a hard drive, a Flash array, a removable media, and/or the like. The storage medium 116 may also include one or more volatile devices, for example, a random access memory (RAM) component and/or the like. The storage medium 116 may further include one or more network storage resources, for example, a storage server, a network attached storage (NAS), a network drive, and/or the like, accessible via one or more networks through the input interface 112 and the output interface 115. Furthermore, faster access storage hardware such as dedicated registers, latches, caches, context addressable memory, and/or the likes may be used to enhance processing speed. Data that has to be accessed frequently such as parameters of the neural network may be stored using faster access devices, such as caches or video random memory (VRAM), while data that is accessed rarely such as data stored for re-training may be stored using slower, yet more flexible and inexpensive means such as a network attached storage, a cloud service, or using a third party service as shown in 123.

The processor 111 may execute one or more software modules such as, for example, a process, a script, an application, an agent, a utility, a tool, an operating system (OS) and/or the like each comprising a plurality of program instructions stored in a non-transitory medium within the program code 114, which may reside on the storage medium 116. For example, the processor 111 may execute a process, comprising inference or training of a system unstructured information analysis using a pipeline of machine learning algorithms such as process 200, 300, which are described in FIG. 2 and FIG. 3 respectively. The processor 111 may estimate characterization quantities for various tasks. Furthermore, the processor 111 may execute one or more software modules for online or offline training of one or more components of the system for table retrieval, as well as auxiliary models.

Figure 2:
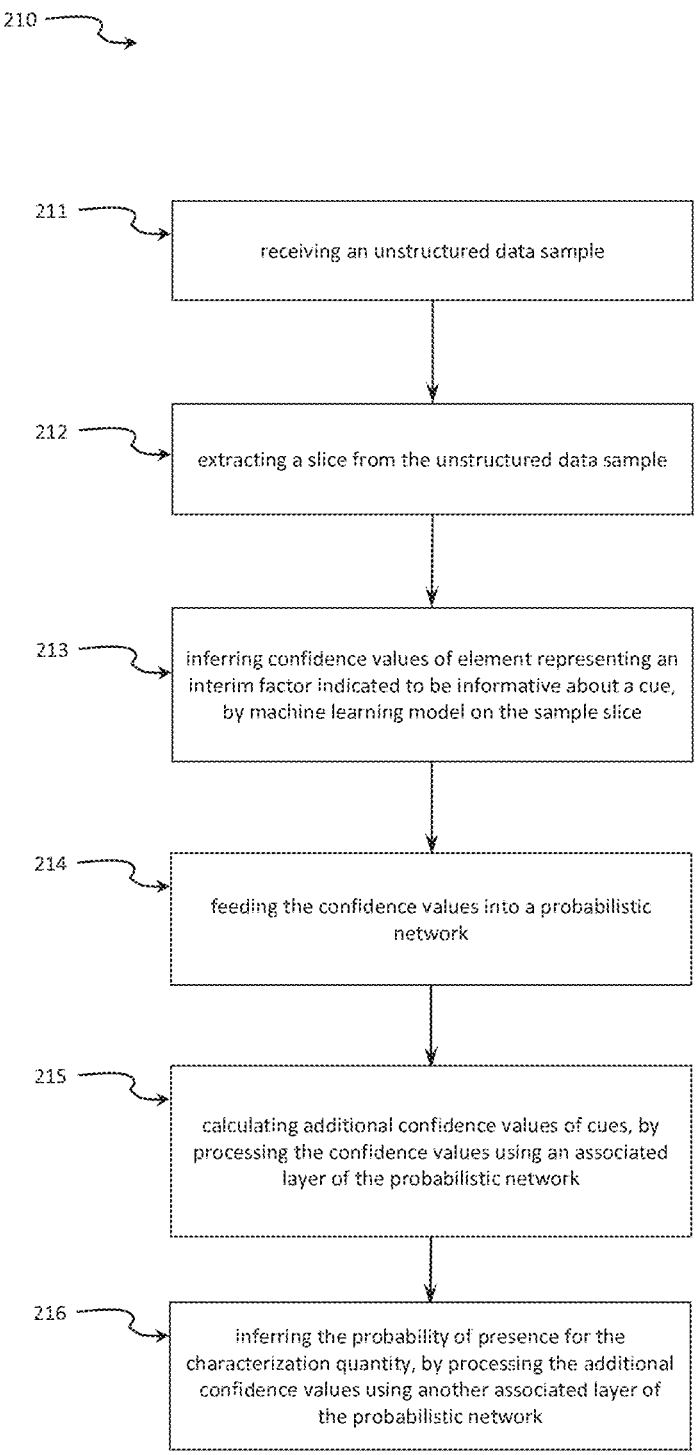
FIG. 2 is a flowchart of an exemplary process for unstructured information analysis using a pipeline of machine learning algorithms, according to some embodiments of the present disclosure.

Reference is now made to FIG. 2 which is a basic flow chart of a first exemplary process for unstructured information analysis using a pipeline of machine learning algorithms, according to some embodiments of the present invention. The exemplary process 200 may be executed for training a system for inferring one or more characterization quantities from unstructured data, for example analytics, video, sound and speech samples, processing, maintenance calls, reviews, internet forum posts, and/or the like. The process 200 may be executed by the one or more processors 111.

The process 200 may start, as shown in 211 by receiving an unstructured data sample through the input interface 112. In some examples, these data samples comprise texts, images, video, sound, time series, and the like. The data samples may be collected form the internet, from a dataset, introduced through a digital or analog media, and/or the like.

The exemplary process 200 continues, as shown in 212, with extracting a slice from the unstructured data sample.

The extracting the at least one sample slice comprises applying a separator from the data or fitting the data into structures.

The slicing applied to the data sample may be based on separators intrinsic to the unstructured data, which may be semantically significant cues in text, such as spaces or punctuation marks. Video and sound may also have intrinsic separator such intermissions. Alternatively, slicing may consider size constraints of machine learning models and perform a fixed size slicing, or search for separators on proximity to the size limits. The sliced data may be fed to unstructured analysis algorithms which may benefit from data size constraints.

The exemplary process 200 continues, as shown in 213, with inferring confidence values of element representing an interim factor indicated to be informative about a cue, by machine learning model on the sample slice.

The model may apply some preprocessing, such as scaling or fitting the data to dimensions of fixed width machine learning models. Second the model may processes the data using machine learning models, which may be known unstructured analysis machine learning models, or other machine learning, knowledge representation, or hybrid models. Exemplary methods used in unstructured analysis comprise Hidden Markov models (HMM), Dynamic time warping (DTW), Dimensionality reduction, neural networks, and extraction and matching of descriptors such as scale-invariant feature transform (SIFT), histogram of gradients (HOG), and the like. Descriptors, autoencoders and/or the like, may be used for identification of associations and self-similarities among entities and other information. Sentiment analysis may be used in speech or text analysis.

Natural language processing techniques may also be used on unstructured, textual data, for example, part of speech tagging, syntactic parsing, named entity recognition (NER), relationship and fact extraction, and other types of linguistic analysis.

Some neural networks may be adapted for sequence processing, encoding, embedding, and inferring therefrom. For example, deep feedforward networks, recurrent neural networks (RNN), and Time Delay Neural Networks (TDNN). Methods such as Latent Sequence Decompositions (LSD) may also be used to split sequences using intrinsically meaningful separators.

These models may infer a plurality of confidence values, each assigned to an element representing an interim factor indicated to be informative about at least one cue, by applying one or more machine learning models on the sample slices. The elements, and similarly the cues may be identified by machine learning expert, field experts, for example technicians who are familiar with appliances such as a washer, or additional artificial intelligence algorithms.

The exemplary process 200 continues, as shown in 214, with feeding the confidence values into a probabilistic network.

The probabilistic network may be a Bayesian network, a capsule network, a Boltzmann machine, implemented using Markov random fields, or other alternative methods to process interim inferences while considering the associated probabilities. The network may comprise a number of layers, and may be balanced or imbalanced. Some of the network structure may be determined by field expert or machine learning experts, and represented in the definition of cues and associated priors. Some training algorithms and/or engineering considerations may modify the network parameters and structure.

The confidence values of the elements may be fed to a probabilistic network configured to infer one or more confidence measures associated with characterization quantity.

The exemplary process 200 continues, as shown in 215, with calculating additional confidence values of cues, by processing the confidence values using an associated layer of the probabilistic network.

The network may comprise several layers, and have one or more nodes associated with predetermined cues, from which the confidence measures associated with characterization quantities may be more readily inferred. For example, an associated layer of the probabilistic network may comprise a plurality of nodes wherein each of the plurality of nodes represents an element, another layer may process the values from the plurality of nodes to generate an additional plurality of confidence values each assigned to a cue.

The cues may be knowledge representation or otherwise predetermined interim representations of a group of elements. Optionally cues confidence may be negatively correlated to some elements, for example while the words "dogs" and "cats" may indicate relations to pets, the word "raining" may imply they are a part of the idiom "raining cats and dogs", rather than relate to pets. Furthermore, a cue may be semantically meaningful, however some may be based on intermediate machine learning representations derived from complex models.

And subsequently, as shown in 216, the process 200 may continue by using the pipeline of machine learning algorithms, executed by one or more processors 111, for inferring the probability of presence for the characterization quantity, by processing the additional confidence values using another associated layer of the probabilistic network.

An additional layer of the probabilistic network may process values from the confidence values of the cues and estimate a confidence value of the characterization quantities.

One or more layers of interim representations such as cues, patterns, sub-patterns, and/or the likes may be used to process the probabilities and enable estimating the confidence values of the characterization quantities. The characterization quantities may be operable conclusions such as a mechanical or a medical diagnosis, a performance key performance indicator (KPI), a public sentiment, a client preference, and/or the like.

It should be noted that variants of this process will be apparent to those skilled in the art and fall within the process scope.

Figure 3:
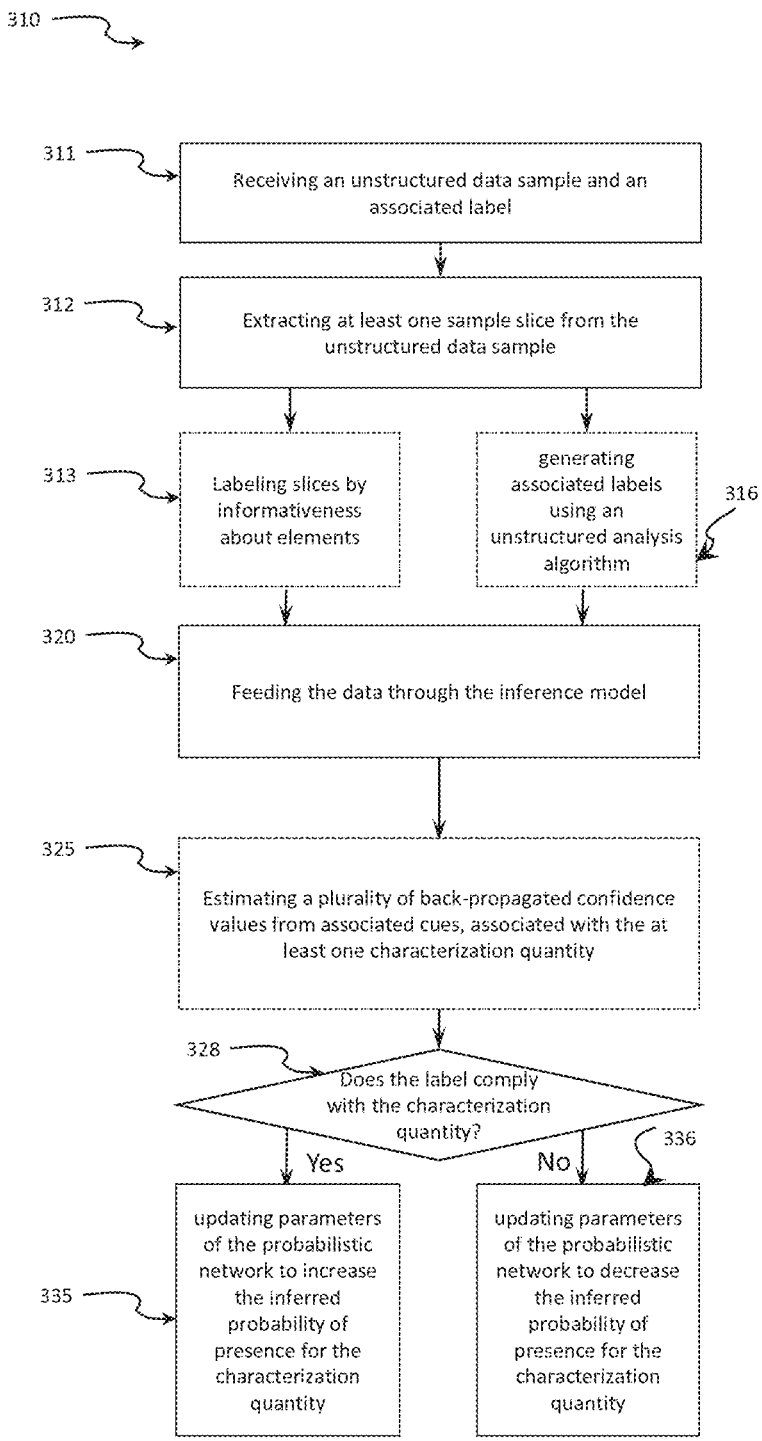
FIG. 3 is a flowchart of an exemplary process for training a system for unstructured information analysis using a pipeline of machine learning algorithms, according to some embodiments of the present disclosure.

Reference is also made to FIG. 3, which is a basic flow chart of an exemplary process for training an unstructured information analysis system using a pipeline of machine learning algorithms, according to some embodiments of the present invention.

The exemplary process 300 may be executed for training a system for inferring one or more characterization quantities from unstructured data, for example analytics, surveillance, video, voice processing, maintenance calls, reviews, internet forum posts, and/or the like. The process 300 may be executed by the one or more processors 111.

The model allows incorporating knowledge representation as a prior for a probabilistic network such as a Bayesian network and gradually update parameters by supervised, semi supervised, or unsupervised training.

The process 300 may start, as shown in 311 by receiving an unstructured data sample and optionally an associated label through the input interface 112. In some examples, these records may comprise one or more texts, sound samples, images, videos, time series, medical signals and/or the likes, and may be extracted from a dataset, obtained from the internet, created using simulations, received from a device such as a camera or microphone, and/or the like.

The process continues by extracting at least one sample slice from the unstructured data sample, as shown in 312.

The slicing may be based on semantically significant cues, which may be intrinsic for the data. For example, text parts may be separated by spaces, commas, periods, colons, and/or the like. Speech may have separators such as intermissions between words, and longer intermissions between sentences, and music may have separators such as whole notes or silent measures. Video may have intrinsic separator such as blank frames or shot endings. Alternatively, slicing may consider limitations of machine learning models such as dimensions of convolutional neural networks.

Optionally, a plurality of sample slices extracted from additional samples of unstructured data are also used. Sample slices may be inherit the label of the unstructured data sample from which they were sliced, however they may be labelled otherwise, using manual, automatic, or hybrid methods. A collection of sample slices may be referred to as a set, for example set1, set2, and set3.

Optionally, the process continues by labeling slices by informativeness about elements, as shown in 313. The labeling may be done by assigning labels to the plurality of sample slices, manually by field experts, semi automatically, or in a semi supervised manner using additional structured or unstructured analysis methods.

Further optionally and alternatively, the processor may continue by generating associated labels using an unstructured analysis algorithm as shown in 316.

When the unstructured data sample was received without an associated label, generate the associated label using one or more unstructured analysis algorithm. Training may be a slow process, however it may be performed using resources not available during inference, such as dedicated hardware or computing server. The label may be generating using machine learning algorithms which are also used for the inference, however other algorithms may also be used for generating these labels.

The process continues by feeding the data through the inference model, as shown in 320. First, the model may apply some preprocessing, such as scaling or fitting the data to dimensions of fixed width machine learning models. Second the model may processes the data using machine learning models, which may be known unstructured analysis machine learning models, or other machine learning, knowledge representation, or hybrid models. These models may infer a plurality of confidence values, each assigned to an element representing an interim factor indicated to be informative about at least one cue, by applying one or more machine learning models on the sample slices. The elements, and similarly the cues may be identified by machine learning expert, field experts, or additional artificial intelligence algorithms Third, the elements may be fed to a probabilistic network configured to calculating a plurality of additional confidence values, each assigned to a cue. Processing the plurality of confidence values using an associated layer of the probabilistic network may generate confidence scores for the cues. The cues may be patterns of elements indicated to be informative about the probability of presence of one or more characterization quantities. A cue may have positive relations with some elements, and negative relations with others. For example, when the model attempts to infer the cause of washer dysfunction, words such as water or leakage may be elements associated with a cue associated with a loose pipe, while silence may be negatively associated therewith.

The processor may optionally continue by estimating a plurality of back-propagated confidence values from associated cues, associated with the at least one characterization quantity, as shown in 325.

After using the probabilistic network to estimate the confidence measure for the at least one characterization quantity he parameters of the probabilistic network, such as the weights, may be used in a bidirectional way, and confidence values of cues may be estimated from confidence values of characterization quantities and these confidence values may be used for estimating the confidence values or probabilities of elements. The plurality of back-propagated element confidence values created thereby mat be used to adjust or further train the machine learning models, and improve their performance based on other models being used.

The processor continues by checking if the label comply with the characterization quantity, as shown in 328.

The checking is need to decide toward which direction the probabilistic network, and other parameters, should be updated. The label may comprise a single characterization quantity or indicate that multiple characterization quantities are present in the data.

When the label complies with the characterization quantity, processor continues by updating parameters of the probabilistic network to increase the inferred probability of presence for the characterization quantity, as shown in 335.

The parameter updating is aimed to increase the confidence in the presence of a characterization quantity, and positively associated cues, when the label indicates the characterization quantity is present in the data. Optionally, similar indications to update parameters may be propagated to one or more unstructured analysis model, to increase the confidence in the presence of positively associated elements, and similarly, to decrease the probabilities of negatively associated elements and cues. Algorithms based on gradient decent, including adaptive rate algorithms for training may determine to which direction and how far should parameters within the probabilistic network change. Some implementation may use a loss function, such as cross entropy loss to help calculate which parameters and how far to adjust. Other loss functions and/or surrogates and variants thereof may be optimized during training by the parameter updating.

When the label does not comply with the characterization quantity, processor continues by updating parameters of the probabilistic network to decrease the inferred probability of presence for the characterization quantity, as shown in 336.

The parameter updating is aimed to decrease the confidence in the presence of a characterization quantity, and positively associated cues, when the label indicates the characterization quantity is not present in the data. Optionally, similar indications to update parameters may be propagated to one or more unstructured analysis model, to decrease the confidence in the presence of positively associated elements, and similarly, to increase the probabilities of negatively associated elements and cues. Algorithms used may be similarly based on gradient decent, and similarly, some implementation may use a loss function and/or surrogates and variants thereof may to optimize the parameters being updated.

Figure 4A:
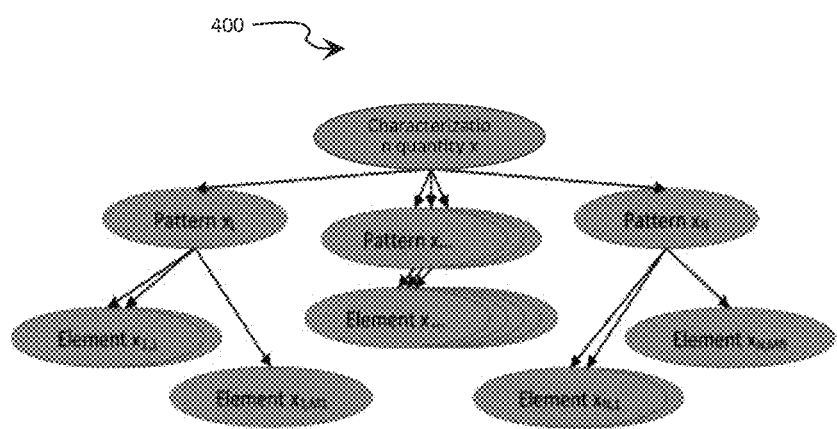
FIG. 4A is an exemplary Bayesian network, according to some embodiments of the present disclosure.

Reference is now made to FIG. 4A which is an exemplary Bayesian network, according to some embodiments of the present disclosure.

The probabilistic network may be a Bayesian network wherein the node associated with the at least one characterization quantity is connected to a plurality of pattern nodes, each associated with a cue, based on a pattern of elements.

The plurality of patterns, or cues may be connected through edges representing the relations between the values and probabilities.

The plurality of pattern nodes associated with a cue, are connected to additional pluralities of nodes, each node from the additional pluralities of nodes may be associated with an element, through edges representing the relations between the values and probabilities. The elements may be inferred from the unstructured analysis, and may be defined manually by expert, or using automated methods. The patterns, or cues, may also be defined manually by field or machine learning experts, a semi-automatic or automatic method, or a hybrid thereof.

The confidence measure for the characterization quantity may be a non-decreasing function of the plurality of additional of confidence measures associated with cues associated with the characterization quantity. Similarly, the confidence measure for the cues, or element patterns, may be a non-decreasing function of the plurality of confidence measures associated with the elements.

Some alternative implementations of the disclosure may comprise a capsule network, a Boltzmann machine, a probabilistic neural network, a Markov random field, or another network capable of propagating probabilities.

Figure 4B:
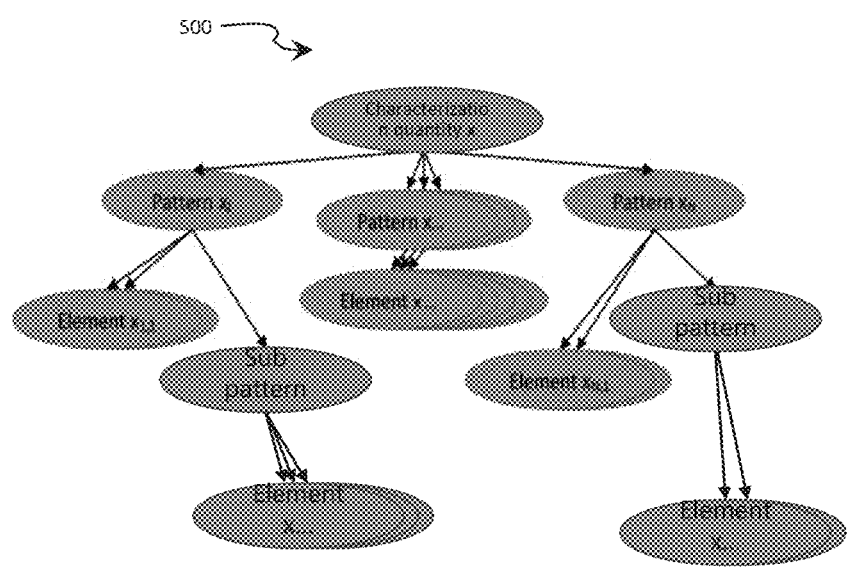
FIG. 4B is an alternative exemplary Bayesian network, according to some embodiments of the present disclosure.

Reference is also made to FIG. 4B which is an alternative exemplary Bayesian network, according to some embodiments of the present disclosure.

This alternative network depicts the cues, which may be patterns of elements, sub-patterns, or both from which the characterization quantity X may be inferred. This network comprises sub-patterns for some of the patterns, for example $X_1$ and $X_n$. The sub-patterns in this exemplary network may be based on elements, however further alternative may have cues based on a single element, which may be equivalent to direct connection of an element to the characterization quantity. Other alternative probabilistic networks may comprise additional layers for some or all of the connections between the elements and the characterization quantity.

Figure 5:
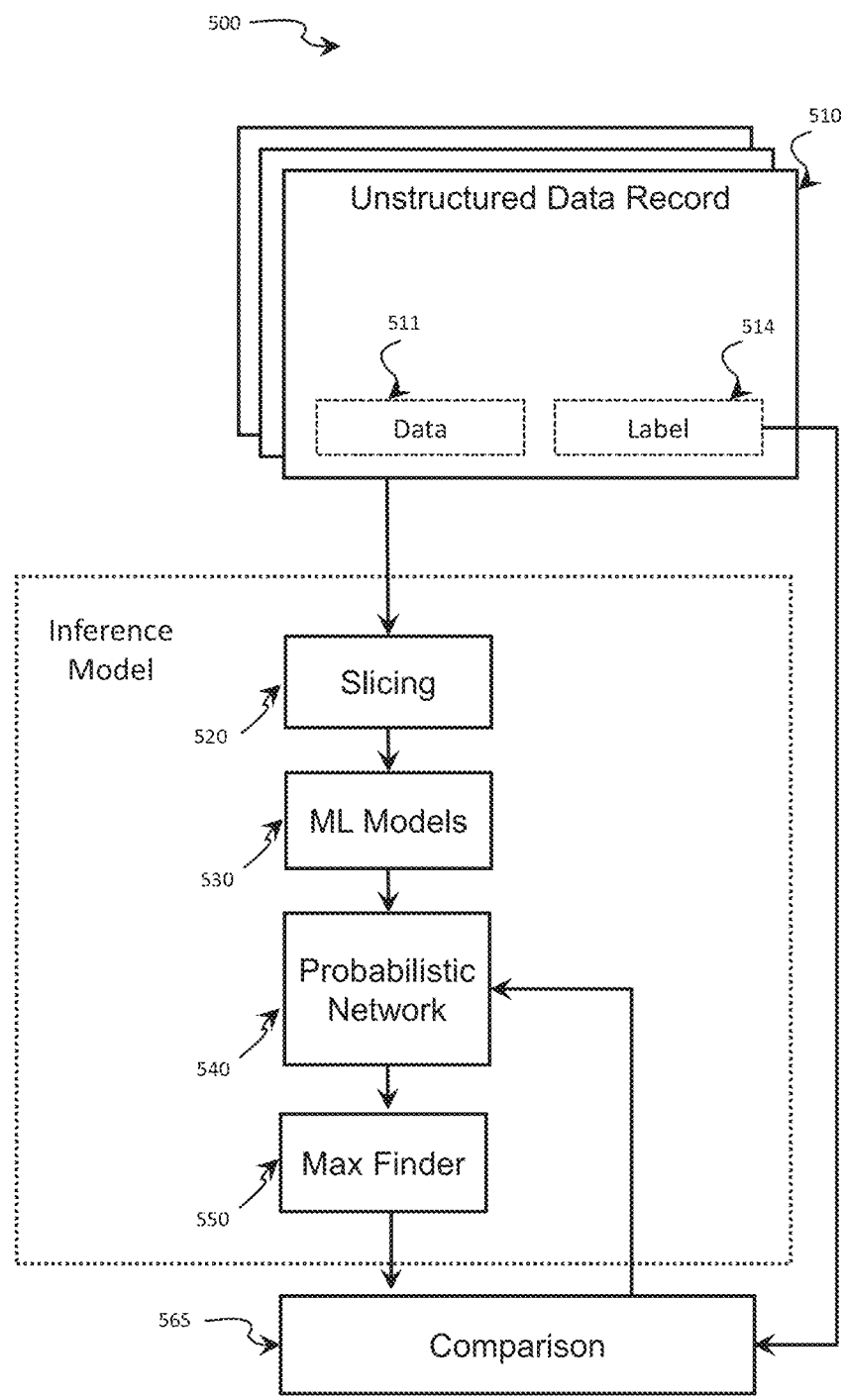
FIG. 5 is a diagram illustrating an exemplary training a system for unstructured information analysis using a pipeline of machine learning algorithms, according to some embodiments of the present disclosure.

Reference is now made to FIG. 5 which is a diagram illustrating an exemplary training a system for unstructured information analysis using a pipeline of machine learning algorithms, according to some embodiments of the present disclosure.

The diagram 500 is shown to better explain how an unstructured data record 510 may be processed for training according the present disclosure. Training data may comprise a plurality of unstructured data records. An exemplary unstructured data record 510 may comprise the data, payload, or unstructured data sample 511, and the label 514. The inference model may comprise a number of stages. The first stage may be slicing 520. The slicing may convert the unstructured data to structured, or semi structured data. The slicing may be based on various cues, which may be intrinsic for the data, such as commas, period, blank frames in video, silent segments in voice, or the like. Alternatively, the slicing may be based on fixed sizes, or apply randomization. A label may be derived from the label assigned to the unstructured data before slicing, or a slice specific label, which may be manually assigned, derived from unstructured analysis, or by hybrids of these methods.

The sliced data may be processed by one or more machine learning models 530. Unstructured data analysis may apply one or more models from a variety of text, voice, image, and/or video analysis models, Markov random fields, fixed size input neural networks, sequential neural networks such as LSTM or GRU, support vector machines (SVM), and/or the like. The models may assign confidence levels, or probabilities of existence of various elements in the data, which may be manually defined or otherwise inferred.

The probabilities of elements may be processed by a probabilistic network 540. The probabilistic network may be a two layer network as shown in FIG. 4A, a more complex network as shown in FIG. 4B, or a simpler network. The network may be based on various architectures and infer probabilities of one or more characterization quantities.

The inferred probabilities of one or more characterization quantities may be processed by a maximum finder 550. The maximum finder may be based on an assumptions that characterization quantities are mutually exclusive, or consider possibilities of multiple characterization quantities present in the same data. A one-hot or softmax based max finder assumes characterization quantities are mutually exclusive, while other implementations such as sigmoid may be used when mutual exclusiveness is not assumed.

The comparison 565 may check whether one or more characterization quantity predictions matches the label 514. When the comparison indicates a match, the parameters of the network which contribute the confidence of the characterization quantity may be increased. When the comparison indicates a mismatch, the parameters of the network which contribute the confidence of the characterization quantity may be decreased. Similarly, parameters that contribute to a confidence of a characterization quantity which mismatch the label may be further lowered, and parameters which would increase the confidence of the characterization quantity associated with the label may be increased when the characterization quantity was not indicated.

It should be noted that this diagram was introduced to help explain an exemplary training method, and a person skilled in the art may consider alternative training methods including genetic algorithms, transfer learning, and the like. Furthermore, the network may be randomly initialized, or may be based on an initial belief, or the like.

Figures 6, 7:
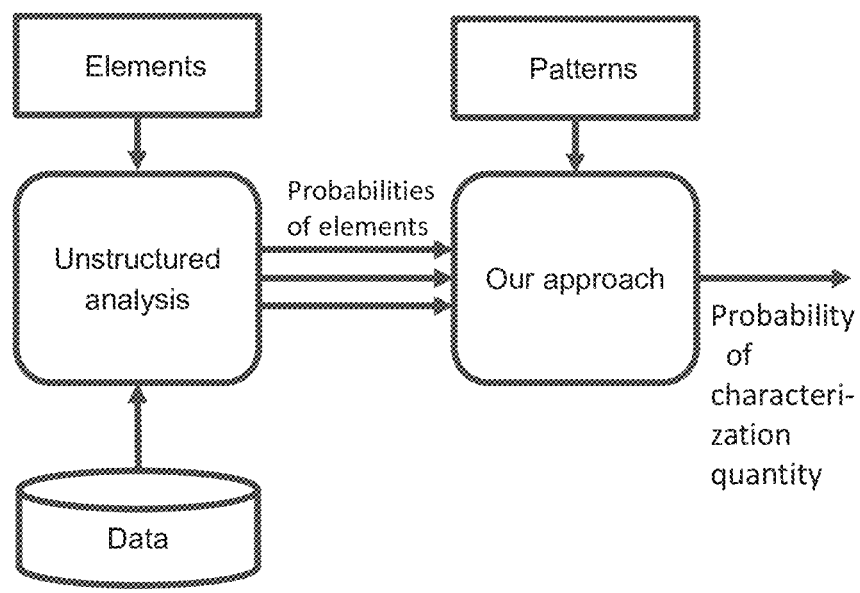
FIG. 6 is an exemplary formulation of a method for unstructured information analysis using a pipeline of machine learning algorithms, according to some embodiments of the present disclosure.
FIG. 7 is a diagram illustrating an exemplary dataflow in unstructured information analysis using a pipeline of machine learning algorithms, according to some embodiments of the present disclosure.

Reference is now made to FIG. 6 which is an exemplary formulation of a method for unstructured information analysis using a pipeline of machine learning algorithms, according to some embodiments of the present disclosure.

This exemplary formulation may be used for estimating the confidence measure for the at least one characterization quantity using the probabilistic network, and the plurality of back-propagated element confidence values, which may be executed during training, however similar formulation may be used in other stages of training as well as inference.

In this formulation L is an identifier of logical block related to the characterization quantity, and Bin(j)[s] represents the digit of binary number j. When used for back-propagated element confidence values, P(Characterization quantity x|Element $x_{(n,m)}=k_{(j,n,m)} \forall n,m$) is determined by Bayesian network. The function F is either the probability or the complement determined by k.

Reference is now made to FIG. 7 which is a diagram illustrating an exemplary dataflow in unstructured information analysis using a pipeline of machine learning algorithms, according to some embodiments of the present disclosure.

The data may be received from various sources, and different formats through the input interface 112. The unstructured analysis may start with a pre-processing such as format matching, resolution adjustment, noise reduction, feature extraction, keyword search, text filtering, natural language processing actions such as tokenization, word embedding and/or the like may be applied to the data. Furthermore, unstructured data samples may be sliced to chunks better matched to some algorithms, for example, a convolutional neural network with a given width. The unstructured analysis may further comprise a cohort of knowledge representation, machine learning, and hybrid algorithms such as visual object detection, segmentation, image classification, video tracking, voice sentiment analysis, text sentiment analysis, text classification, embedding, and the like. Embodiment of the disclosure define elements, which may be inferred from the unstructured analysis, and a confidence level in the presence of elements, namely the probabilities of elements, is processed in our approach by a probabilistic network such as 400. The network may infer the probabilities of cues, which may be directly or inversely related to the probabilities of the associated elements. The probability of one or more characterization quantities may be inferred form the probabilities of the associated elements.

It is expected that during the life of a patent maturing from this application many relevant methods for unstructured analysis, machine learning, neural networks, probabilistic networks, and other inference models will be developed and the scopes of the terms unstructured analysis, machine learning, neural networks, probabilistic networks, are intended to include all such new technologies a priori.

The terms "comprises", "comprising", "includes", "including", "having" and their conjugates mean "including but not limited to".

As used herein, the singular form "a", "an" and "the" include plural references unless the context clearly dictates otherwise. For example, the term "a compound" or "at least one compound" may include a plurality of compounds, including mixtures thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for inferring a probability the system comprising:
a processor adapted to execute a code for:
receiving an unstructured data sample;
extracting at least one sample slice from the unstructured data sample;
inferring a plurality of confidence values, each assigned to an element representing an interim factor indicated to be informative about at least one cue of a plurality of cues, by applying at least one machine learning model on the at least one sample slice;
feeding the plurality of confidence values into a probabilistic network having a plurality of nodes wherein each of the plurality of nodes represents the element; wherein the probabilistic network is a Bayesian network wherein the node associated with the at least one characterization quantity is connected to a plurality of nodes, each associated with a cue from a plurality of cues, through edges representing the relations between the values and probabilities;
calculating a plurality of additional confidence values, each assigned to the at least one cue from the plurality of cues, indicated to be informative about the probability of presence of a characterization quantity, by processing the plurality of confidence values using an associated layer of the probabilistic network; and
inferring the probability of presence for the characterization quantity, by processing the plurality of additional confidence values using another associated layer of the probabilistic network.

2. The system of claim 1, wherein the plurality of nodes associated with a cue, are connected to additional pluralities of nodes, each node from the additional pluralities of nodes associated with an element, through edges representing the relations between the values and probabilities.

3. The system of claim 1, wherein a confidence measure for the at least one characterization quantity is a non-decreasing function of a plurality of additional confidence measures associated with the at least one characterization quantity.

4. The system of claim 1, wherein a cue confidence measure from the additional plurality of confidence measures is a non-decreasing function of the plurality of confidence measures for the plurality of elements associated with the cue.

5. The system of claim 1, wherein extracting the at least one sample slice comprises applying separators intrinsic to the unstructured data.

6. A computer implemented method for training at least one machine learning model for inferring a probability, comprising:
receiving an unstructured data sample;
when the unstructured data sample was received without an associated label, generating the associated label using an unstructured analysis algorithm;
extracting at least one sample slice from the unstructured data sample;
inferring a plurality of confidence values, each assigned to an element representing an interim factor indicated to be informative about at least one cue of a plurality of cues, by applying the at least one machine learning model on the at least one sample slice;
feeding the plurality of confidence values into a probabilistic network having a plurality of nodes wherein each of the plurality of nodes represents an element; wherein the probabilistic network is a Bayesian network wherein the node associated with the at least one characterization quantity is connected to a plurality of nodes, each associated with a cue from a plurality of cues, through edges representing the relations between the values and probabilities;
calculating a plurality of additional confidence values, each assigned at least one cue of the plurality of cues, indicated to be informative about the probability of presence of a characterization quantity, by processing the plurality of confidence values using an associated layer of the probabilistic network;
inferring the probability of presence for the characterization quantity, by processing the plurality of additional confidence values using another associated layer of the probabilistic network;
updating parameters of the probabilistic network representing the indicated prior of the co-occurrence characteristics, so that the probability of presence for the characterization quantity inferred is increased when the characterization quantity complies with the associated label; and
updating parameters of the probabilistic network representing an indicated prior of a co-occurrence characteristics, so that the probability of presence for the characterization quantity inferred is decreased when the characterization quantity does not comply with the associated label.

7. The computer implemented method of claim 6, further comprising using a plurality of sample slices extracted from additional samples of unstructured data.

8. The computer implemented method of claim 7, further comprising assigning labels to the plurality of sample slices.

9. The computer implemented method of claim 8, further comprising using models from the at least one machine learning model on the labelled sample slices and estimating a plurality of back-propagated element confidence values from associated cues, associated with the at least one characterization quantity.

10. The computer implemented method of claim 9, further comprising estimating the confidence measure for the at least one characterization quantity using the probabilistic network, and the plurality of back-propagated element confidence values.

11. A computer implemented method, using a probabilistic network and a plurality of machine learning models, the computer implemented method comprising:
receiving at least one characterization quantity, a plurality of cues associated with the at least one characterization quantity, and at least one cue of the plurality of cues having a plurality of elements associated therewith;
receiving at least one sample of unstructured data;
extracting at least one sample slice from the sample of unstructured data;
generating a plurality of confidence measures for a plurality of elements by processing the at least one sample slice using at least one of the plurality of machine learning models;
generating an additional plurality of confidence measures for the plurality of cues based on confidence measures of the plurality of elements using the probabilistic network; wherein the probabilistic network is a Bayesian network wherein the node associated with the at least one characterization quantity is connected to a plurality of nodes, each associated with a cue from the plurality of cues, through edges representing the relations between the values and probabilities; and generating a confidence measure for the at least one characterization quantity, based on confidence measures of the at least one of the plurality of cues using the probabilistic network.

12. The computer implemented method of claim 11, wherein the plurality of nodes associated with a cue, are connected to additional pluralities of nodes, each node from the additional pluralities of nodes associated with an element, through edges representing the relations between the values and probabilities.

13. The computer implemented method of claim 11, wherein the confidence measure for the at least one characterization quantity is a non-decreasing function of the plurality of additional of confidence measures associated with cues associated with the at least one characterization quantity.

14. The computer implemented method of claim 11, wherein a cue confidence measure from the additional plurality of confidence measures is a non-decreasing function of the plurality of confidence measures for the plurality of elements associated with the cue.

15. The computer implemented method of claim 11, wherein extracting the at least one sample slice comprises applying separators intrinsic to the unstructured data.

16. The computer implemented method of claim 11, further comprising:
updating parameters of the probabilistic network representing an indicated prior to a co-occurrence characteristic, so that the probability of presence for the characterization quantity inferred is increased when the characterization quantity complies with the associated label.

17. The computer implemented method of claim 11, further comprising:
updating parameters of the probabilistic network representing an indicated prior to a co-occurrence characteristic, so that the probability of presence for the characterization quantity inferred is decreased when the characterization quantity does not comply with the associated label.

\* \* \* \* \*